(12) United States Patent
Muramatsu

(10) Patent No.: US 6,520,553 B2
(45) Date of Patent: Feb. 18, 2003

(54) BUMPER MOUNTING STRUCTURE

(75) Inventor: Kazushige Muramatsu, Shizuoka (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 09/995,716

(22) Filed: Nov. 29, 2001

(65) Prior Publication Data

US 2002/0089197 A1 Jul. 11, 2002

(30) Foreign Application Priority Data

Jan. 10, 2001 (JP) .......................... 2001-002041

(51) Int. Cl.[7] .............................................. B60R 19/04
(52) U.S. Cl. ........................................ 293/155; 293/154
(58) Field of Search ................................. 293/155, 154

(56) References Cited

U.S. PATENT DOCUMENTS

| | | | |
|---|---|---|---|
| 4,875,728 A | * | 10/1989 | Copp et al. |
| 5,108,138 A | * | 4/1992 | Kawaguchi |
| 5,195,793 A | * | 3/1993 | Maki |
| 5,580,109 A | * | 12/1996 | Birka et al. |
| 5,915,767 A | * | 6/1999 | Hosada et al. |

FOREIGN PATENT DOCUMENTS

| | | |
|---|---|---|
| JP | 8-2353 | 1/1996 |
| JP | 8-26048 | 1/1996 |

\* cited by examiner

Primary Examiner—D. Glenn Dayoan
Assistant Examiner—Scott Carpenter
(74) Attorney, Agent, or Firm—Greenblum & Bernstein, P.L.C.

(57) ABSTRACT

An insertion portion is provided substantially at the center portion of a rear bumper, and guiding portions are provided at corners of the front end of the insertion portion. A bumper guide is provided substantially at the center portion in the lateral direction of a rear panel of an automobile body. The bumper guide has a lateral guiding portion and a vertical guiding portion, so that the insertion portion of the rear bumper can be positioned in the bumper guide. Flange portions provided on the bumper guide engage lateral walls of the insertion portion so that the rear bumper can be attached to an automobile body with accuracy and stability. The insertion portion of the rear bumper may be placed on the upper surface of the bumper guide, so that the rear bumper can be temporarily held and is prevented from hanging down after it is fixed to the automobile body. Cutouts are provided on the insertion portion, so that clearance is provided to absorb deformation of the rear bumper caused by impact.

14 Claims, 5 Drawing Sheets

BUMPER MOUNTING STRUCTURE

BACKGROUND OF THE INVENTION

1. Field of the Invention

The present invention relates to a bumper mounting structure, such as, for example, an automobile.

2. Description of Related Art

As shown in FIG. 5, a rear bumper 1 has been conventionally mounted on an automobile body such that a weld nut 5 is positioned on a rear panel of the automobile body. The weld nut 5 is positioned in the center portion in the lateral direction of the vehicle of the rear panel 4, and the rear bumper 1 is firmly fixed thereonto by a bolt 6. The automobile body may also include an upper panel member 10, and a weather strip 7 and striker 8 for sealing and locking respectively, a trunk or rear door of the vehicle. The automobile body may further include a striker bracket 9 for mounting the striker 8.

Although in the conventional bumper mounting structure the rear bumper has been positioned on the rear panel of an automobile body in the longitudinal direction of the rear bumper and in the vertical direction thereof by a rear bumper fastening hole, there is a need to adjust the position of the fastening hole before fastening the rear bumper. This need to adjust the position of the fastening hole makes improvements in working efficiency difficult. The fastening hole adjustment would be easy if the diameter of the fastening hole is enlarged, but such enlargement makes it difficult to stabilize the position of the rear bumper with respect to the automobile body.

Further, when an impact is made to the rear bumper, the impact force directly reaches the rear panel 4. Accordingly, the conventional bumper mounting structure is such that a relatively small impact force easily deforms the automobile body.

SUMMARY OF THE INVENTION

The present invention has been developed in consideration of these circumstances and to solve the above problems. Therefore, it is an object of the present invention to provide a bumper mounting structure in which a bumper is easily attached to an automobile body. It is another object of the present invention to provide a bumper mounting structure in which an impact force that can deform a bumper does not affect the automobile body.

The bumper mounting structure according to the present invention has been developed to solve these problems. The bumper mounting structure for fixing a bumper to a front or rear of an automobile body includes a bumper guide, disposed at a suitable location on the automobile body, and is preferably substantially at a center portion in a lateral direction of the automobile body, for mounting the bumper; and an engagement portion, disposed at a suitable location on the bumper, for engaging the bumper guide. The suitable location on the automobile body may be any desired location. The suitable location on the bumper may be an location corresponding to that of the suitable location on the automobile body and preferably is substantially at a center portion in a longitudinal direction.

In one aspect of the present invention, the engagement portion to be engaged with the bumper guide of the bumper includes an insertion portion. A lateral guiding portion and a vertical guiding portion for cooperation with the insertion portion are provided on the bumper guide. The bumper mounting structure of the present invention further includes guiding portions provided at both corners of a front end of the insertion portion. The bumper mounting structure further includes a pair of flange portions provided on the bumper guide so as to face each other, and a pair of lateral walls provided on the insertion portion so as to be engaged with the pair of flange portions, respectively. The engagement portion to be engaged with the bumper guide includes an insertion portion, and the bumper guide is provided with a flat upper surface on which the insertion portion is placed. The bumper mounting structure further includes a cutout, provided at a base of the insertion portion of the bumper, so that clearance in the forward and rearward directions of the vehicle is provided between the bumper guide and the bumper when the bumper is attached to an automobile body.

In another aspect of the present invention, a bumper mounting structure configured to fix a bumper to a front or rear of an automobile body is provided, including a bumper guide that mounts a bumper, the bumper guide being provided substantially at a center portion in a lateral direction of the automobile body, and an engagement portion that engages the bumper guide, the engagement portion being provided substantially at a center portion in a longitudinal direction of the bumper. The bumper guide may further be mounted on the automobile body substantially at the center portion in the lateral direction of the automobile body and the engagement portion may be provided on the bumper substantially at a center portion in a longitudinal direction of the bumper.

According to a further aspect of the present invention, the engagement portion to be engaged with the bumper guide includes an insertion portion, and the bumper guide is provided with a lateral guiding portion and a vertical guiding portion for receiving the insertion portion. The insertion portion may further include guiding portions provided at corners of a front end of the insertion portion. The guiding portions provided at the corners of the front end of the insertion portion may further include chamfered edges.

In a further aspect of the present invention, the bumper mounting structure further includes a pair of flange portions provided on the bumper guide so as to face each other, and a pair of lateral walls provided on the insertion portion so as to be engaged with the pair of flange portions. The bumper guide may further include a flat upper surface on which the insertion portion is placed.

According to a further aspect of the present invention, the bumper mounting structure may further include a cutout provided at a base of the insertion portion, whereby clearance in a vehicle forward and rearward direction is provided between the bumper guide and the bumper when the bumper is attached to an automobile body. The bumper guide may further include a longitudinal wall surface that extends from and forms an angle with the flat upper surface, and a groove provided in the bumper guide that extends from the upper surface to the longitudinal wall surface and increases the rigidity of the bumper guide.

A further aspect of the present invention provides a bumper guide for mounting a bumper on an automobile body including a lateral guiding portion, and a vertical guiding portion, wherein the bumper guide is configured to be provided at a suitable location on an automobile body and to engage an engagement portion provided at a suitable location on a bumper. The bumper guide may be provided at a substantially center portion in a lateral direction of the automobile body.

A further aspect of the present invention provides an engagement portion for mounting a bumper on an automobile body including an insertion portion, the insertion portion including a pair of lateral walls and a chamfered guiding portion provided on each lateral wall at a front end of the insertion portion, wherein the engagement portion is configured to be provided at a suitable location on a bumper to engage a bumper guide provided at a suitable location on an automobile body. The engagement portion may be provided at a substantially center portion in a longitudinal direction of the bumper.

BRIEF DESCRIPTION OF THE DRAWINGS

The above and other objects, features and advantages of the present invention will be made apparent from the following description of the preferred embodiments, given as non-limiting examples, with reference to the accompanying drawings, in which.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspect of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Referring now to FIGS. 1–4, a description will be provided of an embodiment of a bumper mounting structure according to the present invention.

Figure 1:
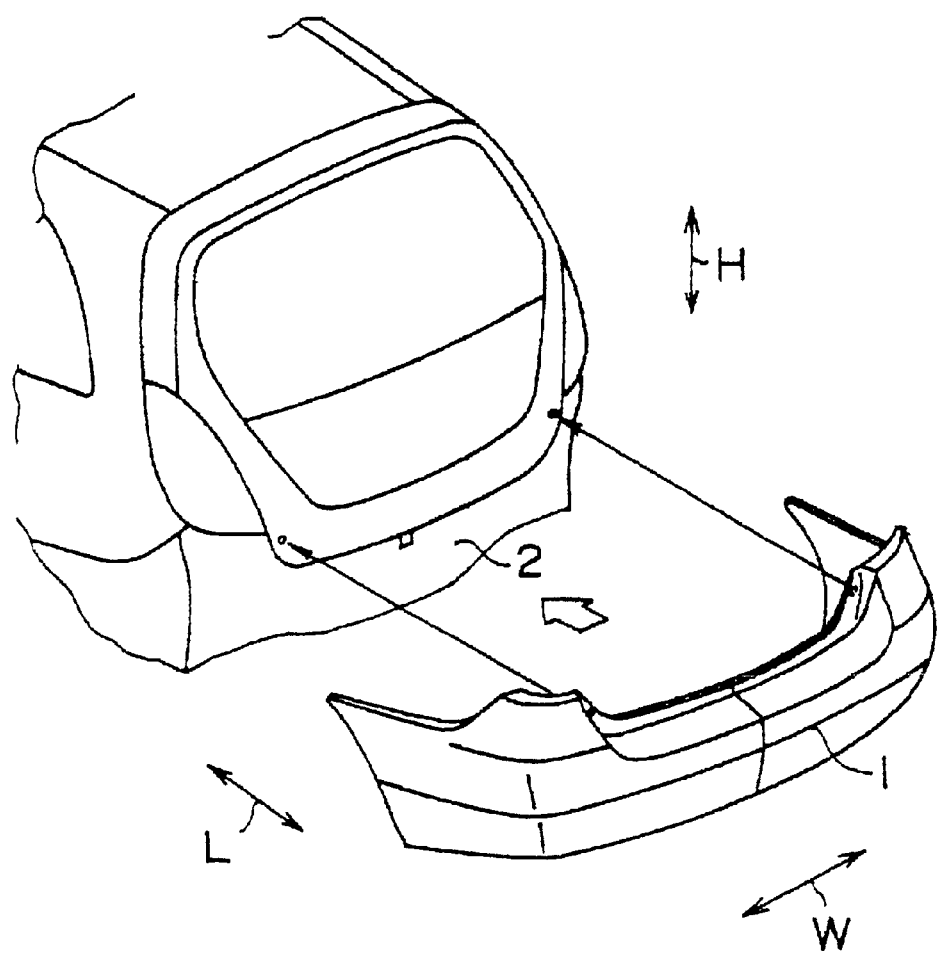
FIG. 1 is an exploded perspective view of a rear bumper and the rear of a vehicle to which the bumper mounting structure according to an aspect of the present invention is applied.

As shown in the embodiment of FIG. 1, a bumper mounting structure according to the present invention is provided for attaching a rear bumper 1 to the rear of an automobile body 2. The rear bumper 1 may be attached to the automobile body 2 by any suitable fixing elements, such as, for example, a plurality of screws, bolts, or clips (not shown), and, independently of such fixing elements, the bumper mounting structure of the present invention is constructed as follows.

Figure 2:
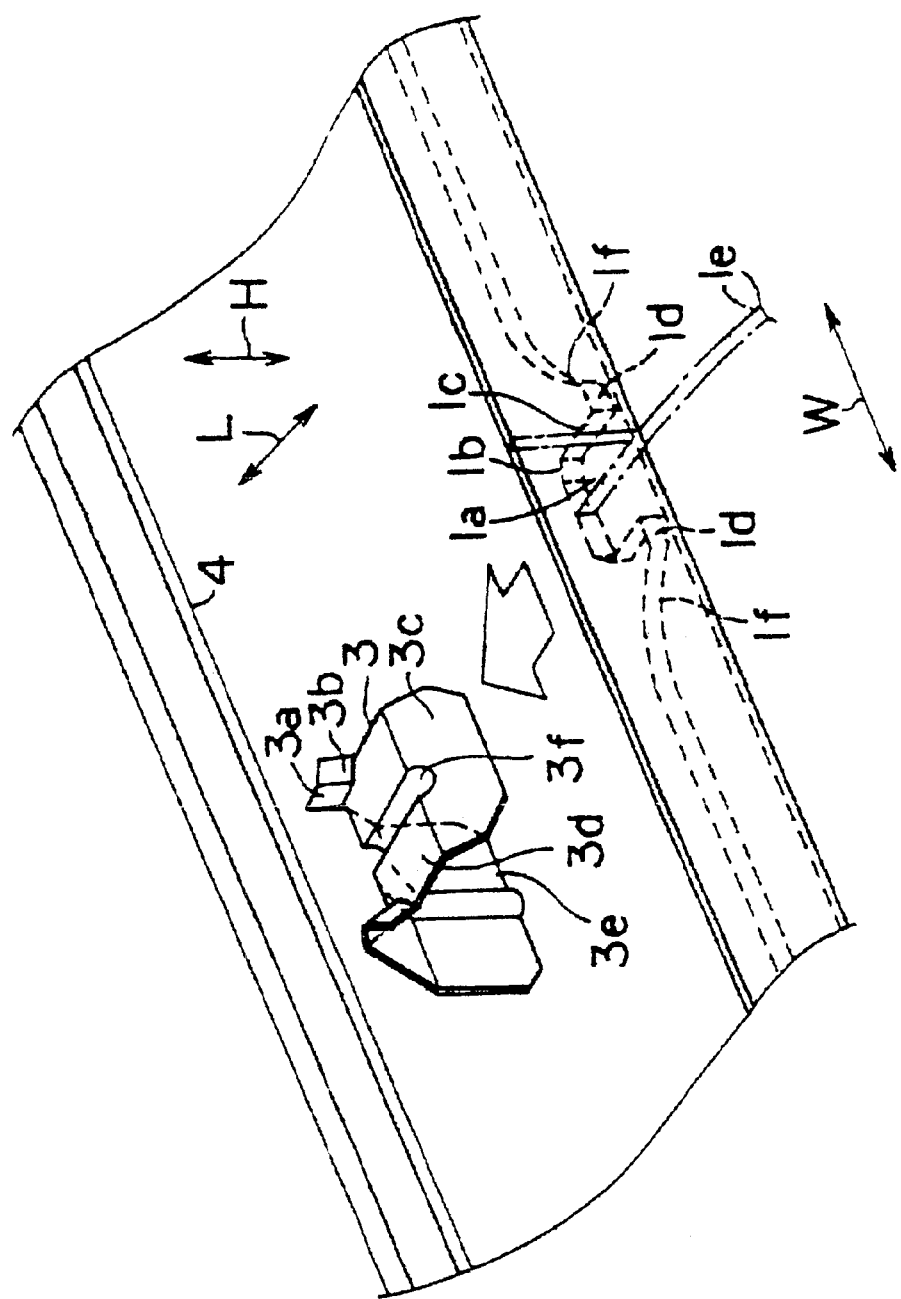
FIG. 2 is an exploded perspective view of the upper part of the rear of the vehicle and the rear bumper of FIG. 1 substantially at the center portion in the lateral direction of the vehicle and showing a bumper mounting structure according to an aspect of the present invention.
Figure 3:
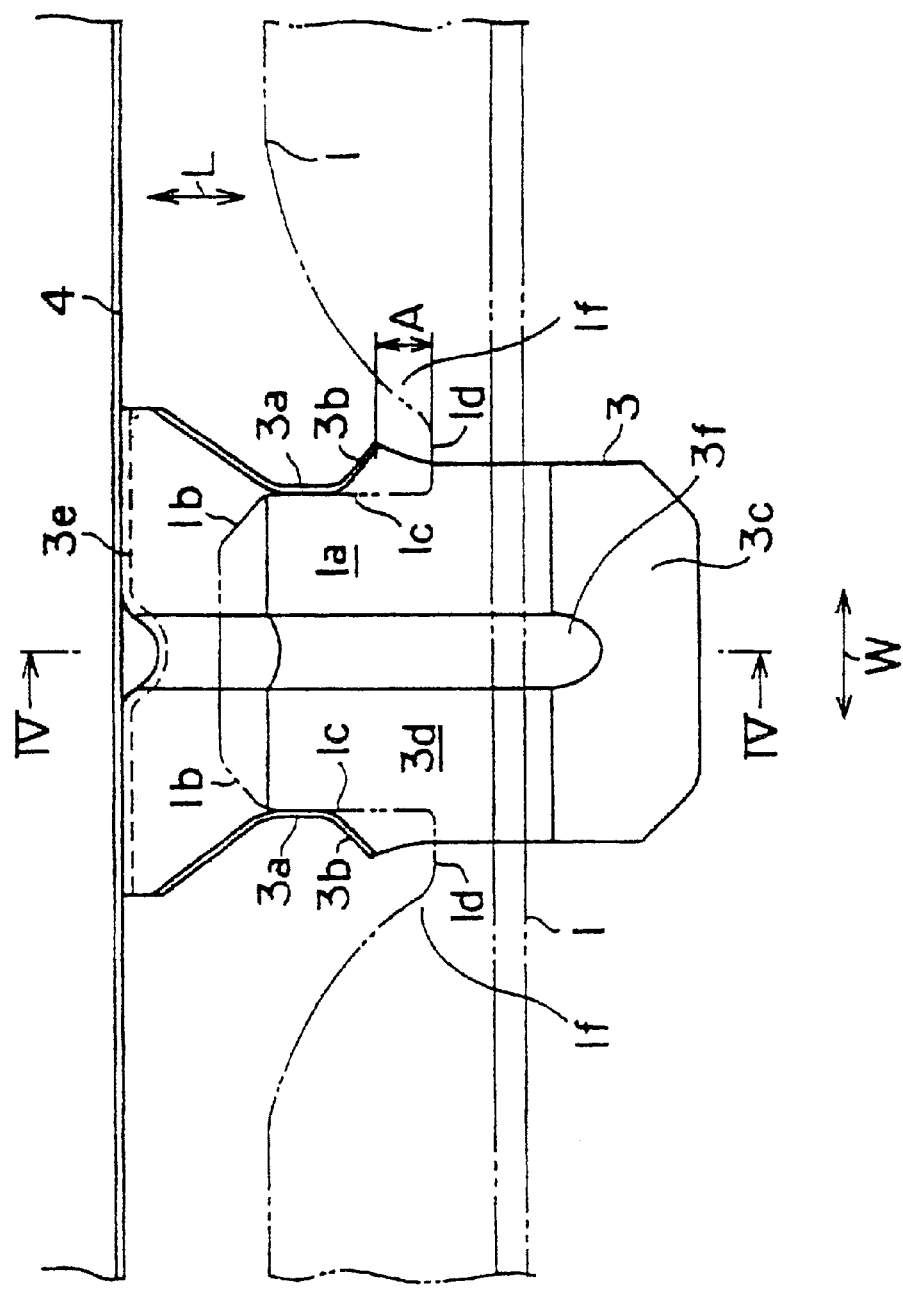
FIG. 3 is a plan view showing the attachment of the bumper mounting structure of FIG. 2.
Figure 4:
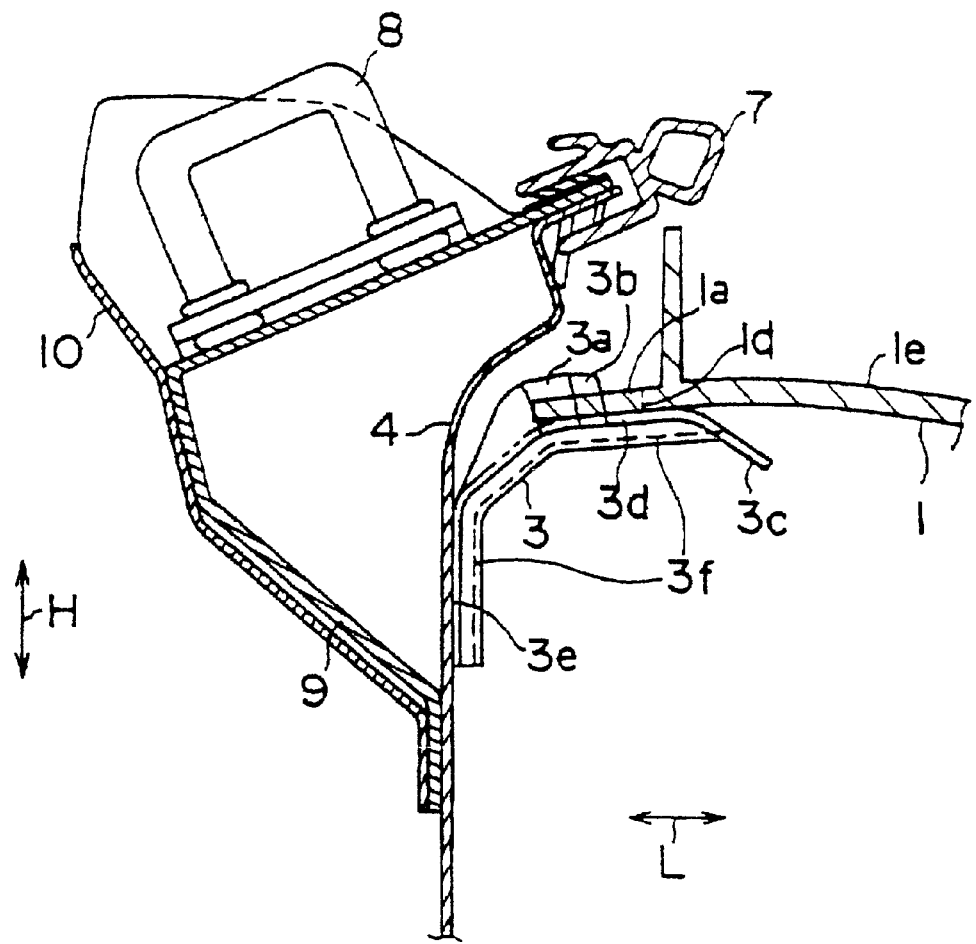
FIG. 4 is a sectional view along line IV—IV of the bumper mounting structure of FIG. 3.
Figure 5:
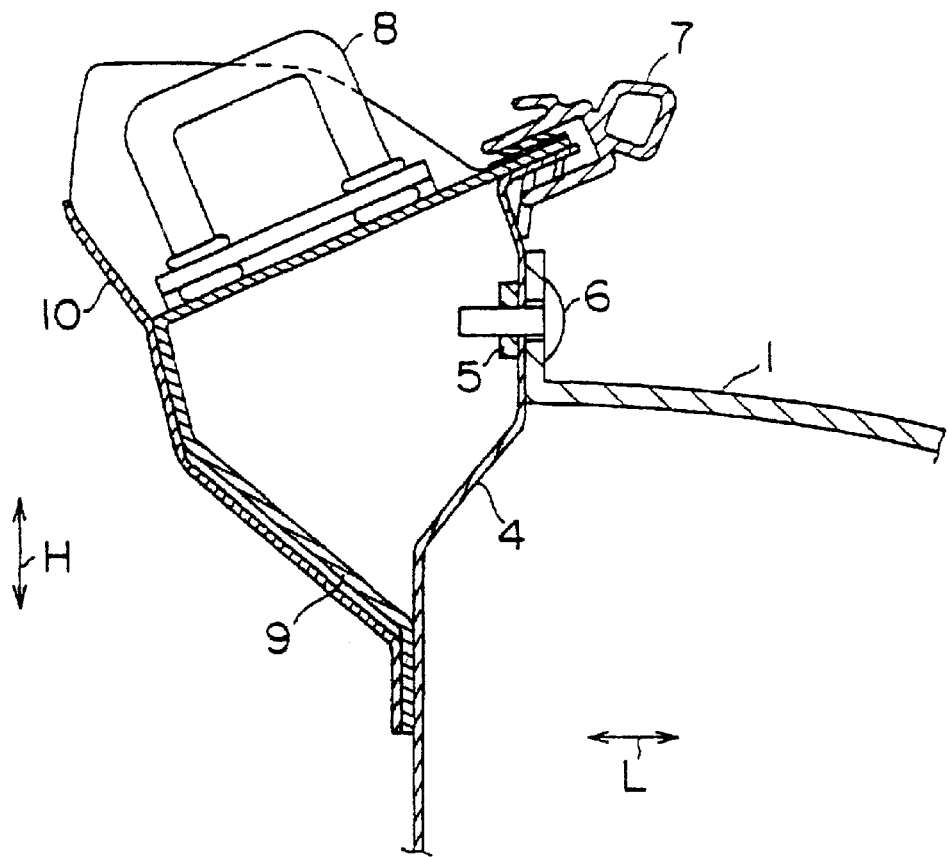
FIG. 5 is a sectional view of a conventional bumper mounting structure.

As shown in FIGS. 2–4, a bumper guide 3 may be provided substantially at the center, in the lateral (or widthwise) direction W of a vehicle, of a rear panel 4 positioned at the rear end of an automobile body. The bumper guide 3 may be provided with lateral or vehicle width direction guiding portions 3b and a vertical or vehicle height direction guiding portion 3c. In the figures, H designates a vertical direction. As shown particularly in FIG. 3, a pair of lateral guiding portions 3b is provided, and the two lateral guiding portions 3b extend in substantially opposite directions such that when the bumper guide is mounted on the rear of a vehicle, the lateral guiding positions 3b become farther apart from each other as they approach the rear part of the vehicle. Additionally, as shown particularly in FIGS. 2 and 4, the vertical guiding portion 3c is configured such that when the bumper guide is mounted on the rear of a vehicle, the vertical guiding portion 3c extends lower as it approaches the rear part of the vehicle. Therefore, when the rear bumper is attached to the rear end of a vehicle, an insertion portion 1a of the rear bumper 1 can be easily inserted into the bumper guide 3, using the lateral guiding portions 3b and the vertical guiding portion 3c of the bumper guide 3 as guides.

As shown particularly in FIGS. 2 and 3, the engagement portion including insertion portion 1a is provided on the rear side of the rear bumper 1 substantially at the center portion in the longitudinal direction of the rear bumper 1. Chamfered guiding portions 1b may be provided at both corners, respectively, of the front end of the insertion portion 1a. Therefore, in cooperation with the lateral guiding portions 3b, the guidable range in the longitudinal direction of the rear bumper 1 is enlarged, and attachment of the rear bumper 1 to the automobile body is further facilitated.

Although the bumper guide 3 has been shown substantially at the center in the lateral direction of the vehicle, and the engagement portion including the insertion portion 1a has been shown substantially at the center portion in the longitudinal direction of the bumper 1, the bumper guide 3 may be positioned at any location in the lateral direction of the vehicle and the engagement portion including the insertion portion 1a may be positioned at any location in the longitudinal direction of the bumper 1, as long as the bumper guide 3 and the engagement portion including the insertion portion 1a are positioned for cooperation with each other.

As shown particularly in FIGS. 2–4, at the bumper guide 3, a pair of flange portions 3a is provided. The flange portions 3a are positioned so as to face each other. The distance between the pair of flange portions 3a is substantially equal to the distance between a pair of lateral walls 1c of the insertion portion 1a of the rear bumper 1. Therefore, after the rear bumper 1 is attached to the automobile body 2, the lateral walls 1c of the insertion portion 1a of the rear bumper 1 are engaged with the flange portions 3a of the bumper guide 3. Thus, the rear bumper 1 may be mounted on the automobile body 2 with accuracy and in a stable position.

Additionally, as shown in FIGS. 3 and 4, since the insertion portion 1a of the rear bumper 1 is configured to lie on a flat upper surface 3d of the bumper guide 3, the insertion portion 1a of the rear bumper 1 may be supported by the upper surface 3d of the bumper guide 3 when attached. Therefore, the rear bumper can be temporarily positioned on the bumper guide 3 before it is fixed with fixing elements. Further, after the rear bumper 1 is fixed to the automobile body 2, the upper surface 1e (see FIG. 4) of the rear bumper 1 can be effectively prevented from hanging downward.

As shown in FIGS. 3 and 4, recessed portions or cutouts 1d are provided at base portion 1f, respectively, of both sides of the insertion portion 1a of the rear bumper 1. Clearance A in the vehicle forward and rearward direction L is provided between the bumper guide 3 and the rear bumper 1 due to the outputs 1d. Accordingly, when a relatively weak impact hits and pushes the rear bumper 1 in the forward direction of the vehicle so as to deform the rear bumper 1, the deformation can be absorbed in this clearance A so as not to damage the automobile body 2.

As shown in FIGS. 3 and 4, in order to improve the rigidity of the bumper guide 3, a groove or channel 3f is provided in the middle of the bumper guide 3 that extends from the upper surface 3d to the longitudinal wall surface 3e on the front side. Further, as shown particularly in FIG. 4, a weather strip 7 for sealing a trunk or rear door and for exterior improvement may be provided in a manner known to those skilled in the art in the vicinity of the bumper guide 3. Further a striker 8 may be mounted in a manner known to those skilled in the art on the automobile body 2 with the aid of a striker bracket 9. A back panel upper member 10 is also provided there. The striker 8 may be provided for cooperation with a locking mechanism to lock a trunk or rear door on the rear of the vehicle.

In this embodiment, the rear bumper 1 is configured so that the insertion portion 1a is inserted between the flange portions 3a of the bumper guide 3. However, in an alternative embodiment of the bumper mounting structure according to the present invention, the bumper mounting structure can be constructed such that the rear bumper 1 is positioned by engagement with the outer sides of the flange portions 3a. Further, in the embodiment, shown in FIGS. 2–4 the female type bumper guide 3 is provided on the automobile body 2, and the male type insertion portion 1a is provided on the rear bumper 1. However, in a further embodiment of the bumper mounting structure according to the present invention, the bumper mounting structure can be constructed such that the female type and the male type are replaced by each other. In other words, the bumper guide 3 may be provided on the bumper 1 and the insertion portion 1a may be provided on the automobile body 2. Further, in the embodiment shown in FIGS. 2–4, the bumper mounting structure according to the present invention is provided so that the rear bumper 1 is attached to the rear part of the automobile body 2. However, in an alternative embodiment, the bumper mounting structure of the present invention may be provided so that a front bumper is attached to the front part of the automobile body 2.

The bumper mounting structure according to the present invention is configured so that the bumper mounting structure may be used for fixing a bumper to the front part or rear part of an automobile body. A bumper guide is disposed substantially at the center portion in the vehicle width direction of the automobile body to which the bumper is attached, and an engagement portion to be engaged with the bumper guide is provided substantially at the center portion in the longitudinal direction of the bumper. Therefore, the bumper can be easily mounted on the automobile body.

The engagement portion to be engaged with the bumper guide of the bumper includes an insertion portion, and, if a lateral guiding portion and a vertical guiding portion for the insertion are provided on the bumper guide, the insertion portion of the bumper can be easily engaged with the bumper guide. Therefore, the bumper can be easily attached to the automobile body, and the attachment can be improved.

Further, the insertion portion of the bumper can be more easily engaged with the bumper guide by providing the guiding portion at both corners of the front end of the insertion portion. Therefore, the bumper can be more easily attached, and the attachment can be improved.

The pair of flange portions are provided so as to face each other, and the pair of lateral walls that are engaged with the pair of flange portions, respectively, are provided at the insertion portion of the bumper. Accordingly, the bumper can be positioned by engaging the lateral walls with the flange portions of the bumper guide when attached. Therefore, the positioning of the bumper is carried out easily, accurately, and stably, and the attachment can be further improved.

The engagement portion to be engaged with the bumper guide includes an insertion portion, and, by providing a flat upper surface on which the insertion portion lies on the bumper guide, the insertion portion can be placed on the upper surface of the bumper guide when attached. Therefore, the bumper can be temporarily held before it is fixed by the bumper fixing element and performance can be improved. Further, the bumper can be prevented from hanging down even after it is attached, and reductions in cost and exterior improvements can be achieved.

The cutout or recessed portions are provided at the base of the insertion portion of the bumper mounting structure, thereby providing a clearance in the vehicle forward and rearward direction between the bumper guide and the bumper when the bumper is attached to the automobile body. Accordingly, even if a relatively weak impact force is applied to the bumper so as to deform the bumper, the automobile body can be prevented from being damaged with the aid of the bumper, since a deforming space of the bumper is provided between the automobile body and the bumper by the clearance in the vehicle forward and rearward direction.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

The present disclosure relates to subject matter contained in priority Japanese Application No. 2001-002041, filed on Jan. 10, 2001, which is herein expressly incorporated by reference it its entirety.

What is claimed is:

1. A bumper mounting structure for fixing a bumper to a front or rear of an automobile body, comprising:

a bumper guide configured to mount a bumper, said bumper guide being provided at a suitable location on the automobile body; and an engagement portion configured to engage said bumper guide, said engagement portion being provided at a suitable location on the bumper;

wherein said engagement portion includes an insertion portion; and said bumper guide includes a flat upper surface configured to receive said insertion portion, a longitudinal wall surface that extends from and forms an angle with said flat upper surface, and a groove provided in said bumper guide that extends along said upper surface to said longitudinal wall surface to thereby increase the rigidity of said bumper guide.

2. The bumper mounting structure according to claim 1, wherein said bumper guide is provided with a lateral guiding portion and a vertical guiding portion for receiving said insertion portion.

3. The bumper mounting structure according to claim 2, said insertion portion further comprising guiding portions provided at corners of a front end of said insertion portion.

4. The bumper mounting structure according to claim 3, wherein said guiding portions provided at said corners of the front end of said insertion portion comprise chamfered edges.

5. The bumper mounting structure according to 2, said bumper mounting structure further comprising a pair of flange portions provided on said bumper guide so as to face each other, and a pair of lateral walls provided on said insertion portion so as to be engaged with said pair of flange portions.

6. The bumper mounting structure according to claim 2, further comprising a cutout provided at a base of said insertion portion, so that clearance in a vehicle forward and rearward direction is provided between said bumper guide and the bumper when the bumper is attached to an automobile body.

7. The bumper mounting structure according to claim 1, further comprising a cutout provided at a base of said insertion portion of the bumper, so that clearance in a vehicle forward and rearward direction is provided between said bumper guide and the bumper when the bumper is attached to an automobile body.

8. The bumper mounting structure according to claim 1, wherein said bumper guide is mounted at said suitable location on the automobile body and said engagement portion is provided at said suitable location on the bumper.

9. The bumper mounting structure according to claim 1, wherein said suitable location on the automobile body is at a substantially center portion in a lateral direction of the automobile body, and said suitable location on the bumper is at a substantially center portion in a longitudinal direction of the bumper.

10. In combination, an automobile body;
    a bumper; and
    a bumper mounting structure according to claim 1.

11. A bumper guide configured to mount a bumper on an automobile body, said bumper guide comprising:
    a lateral guiding portion; and
    a vertical guiding portion;
    wherein said bumper guide is configured to be provided at a suitable location on an automobile body and to engage an engagement portion provided at a suitable location on a bumper;
    wherein said lateral guiding portion includes a pair of flange portions spaced from and facing each other and a pair of lateral guiding elements, each of said pair of lateral guiding elements extending from one of said pair of flange portions and in directions opposed to one another, and said vertical guiding portion is positioned between a first and a second of each of said pair of flange portions and said pair of lateral guiding elements, wherein said pair of flanges and said pair of lateral guiding elements are configured to receive the engagement portion between said first and said second of each of said pair of flange portions and said pair of lateral guiding elements.

12. The bumper guide according to claim 11, wherein said suitable location on the automobile body is at a substantially center portion in a lateral direction of the automobile body, and said suitable location on the bumper is at a substantially center portion in a longitudinal direction of the bumper.

13. The bumper guide for mounting a bumper on an automobile body according to claim 11, wherein said bumper guide further comprises a flat upper surface positioned between a first and a second of each of said pair of flange portions and said pair of lateral guiding elements, wherein said flat upper surface is configured to receive the engagement portion of a bumper thereon.

14. The bumper guide for mounting a bumper on an automobile body according to claim 13, said bumper guide further comprising a longitudinal wall surface that extends from and forms an angle with said flat upper surface, and a groove provided in said bumper guide that extends along said upper surface to said longitudinal wall surface to thereby increase the rigidity of said bumper guide.

* * * * *